(12) United States Patent
Willis et al.

(10) Patent No.: US 6,895,046 B1
(45) Date of Patent: May 17, 2005

(54) SYSTEM AND METHOD OF PROVIDING A SPREAD SPECTRUM PULSE WIDTH MODULATOR CLOCK

(75) Inventors: Scott C. Willis, Manassas, VA (US); Richard M. Brosch, Manassas, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 788 days.

(21) Appl. No.: 09/591,731

(22) Filed: Jun. 12, 2000

Related U.S. Application Data
(60) Provisional application No. 60/159,974, filed on Oct. 18, 1999.

(51) Int. Cl.[7] ............................................... H03K 7/08
(52) U.S. Cl. ........................ 375/238; 375/239; 363/34; 363/20
(58) Field of Search ................................ 375/238, 239; 363/20, 24, 34; 323/324; 303/7; 327/172; 320/212, 213; 329/312, 313; 332/109–112

(56) References Cited

U.S. PATENT DOCUMENTS

| | | | | |
|---|---|---|---|---|
| 5,006,973 A | * | 4/1991 | Turner | 363/34 |
| 5,309,344 A | * | 5/1994 | Smith | 363/20 |
| 5,631,920 A | | 5/1997 | Hardin | 375/200 |
| 5,812,940 A | | 9/1998 | Lindell | 455/114 |
| 5,862,089 A | | 1/1999 | Raad et al. | 365/203 |
| 6,049,471 A | * | 4/2000 | Korcharz et al. | 363/20 |

FOREIGN PATENT DOCUMENTS

| | | | |
|---|---|---|---|
| EP | 0 163 313 A2 | 12/1985 | H03B/29/00 |

OTHER PUBLICATIONS

Unitrode Products from Texas Instruments, High Speed PWM Controller.*
Chet B. Chesher, "Crystal Oscillator Reduces EMI from Computers", *NEL Frequency Controls, Inc.*, pps. 1–3 (Jul. 4, 1997).

Harris Semiconductor, "HCTS393MS: Radiation Hardened Dual 4–Stage Binary Counter", *Harris Corporation*, Spec No. 518633, File No. 3071.1, pps. 1–9 (Aug. 1995).

IC Works, "Application Note 201: EMI Suppression Techniques with Spread Spectrum Frequency Timing Generator (SSFTG) ICs", *IC Works*, pps. 1–2 (Sep. 1998).

Unitrode, "Application Note: UC3842/3/4/5 Provides Low––Cost Current–Mode Control", *Unitrode Corporation*, pps. (3–53)–(3–66).

Unitrode, "Current Mode PWM Controller", *Unitrode Corporation*, pps. 1–7 (Apr. 1997).

A copy of PCT International Search Report for International Application No. PCT/US00/28748 mailed on Feb. 14, 2001 (6 pages).

* cited by examiner

*Primary Examiner*—Young T. Tse
*Assistant Examiner*—Edith Chang
(74) *Attorney, Agent, or Firm*—Dicke, Billig & Czaja, PLLC

(57) ABSTRACT

A system and method of creating a pulse train signal of a pulse width modulator whose fundamental frequency is time-varying is disclosed. The electrical system includes a pulse width modulator which provides a pulse train signal. The system also includes a power source connected to the pulse width generator. The system further includes a binary counter having an input and a plurality of outputs, wherein the pulse train signal generated by the pulse width modulator is operatively coupled to the input of the binary counter. A plurality of resistors are operatively coupled to the plurality of outputs of the binary counter and operatively coupled to a node. A timing resistor is operatively coupled between a first voltage potential and the node, while a timing capacitor is operatively coupled between the node and a second voltage potential. The node is operatively coupled to an input of the pulse width modulator.

33 Claims, 4 Drawing Sheets

SYSTEM AND METHOD OF PROVIDING A SPREAD SPECTRUM PULSE WIDTH MODULATOR CLOCK

CROSS REFERENCE TO RELATED APPLICATIONS

This Non-Provisional Utility Patent Application claims the benefit of the filing date of U.S. Provisional Application Ser. No. 60/159,974, filed Oct. 18, 1999, entitled "SYSTEM AND METHOD OF PROVIDING A SPREAD SPECTRUM PULSE WIDTH MODULATOR CLOCK."

FIELD OF THE INVENTION

The present invention relates generally to an electrical system and its associated electromagnetic interference. More particularly, the present invention relates to an improved system and method of spreading electromagnetic interference associated with an electrical device or system over a range of frequencies.

BACKGROUND OF THE INVENTION

Power supplies for many electronic devices employ a pulse width modulator. These power supplies, acting in a switch mode, either turn full on or full off and provide a stream of current pulses.

Many electronic devices also employ microprocessors or other digital circuits which require one or more clock signals for synchronization. For example, a clock signal permits the precise tuning of events in the microprocessor. Typical microprocessors may be synchronized by a free running oscillator, such as a crystal-driven circuit, an LC-tuned circuit, or an external clock source. Clock rates up to and beyond 40 megahertz are common in personal computers. The various parameters of a clock signal are typically specified for a microprocessor including frequency ranges.

Power supplies and high performance, microprocessor-based devices using leading edge, high-speed circuits are particularly susceptible to generating and radiating unwanted electromagnetic interference (EMI), which can interfere with other devices located in close proximity. The spectral components of the unwanted EMI emissions typically have peak amplitudes at harmonics of the fundamental frequency of the clock circuit.

Conventional techniques for reducing EMI emissions include either a large and expensive passive inductor capacitor filter, or a combination of a shielding technique provided by an enclosure and filtering components. In many cases, filtering and shielding can easily add several dollars of cost to a system, and may not be enough to allow a system to pass federal EMI regulations. Electronic devices must meet maximum EMI radiation limits as specified by federal regulations and comparable regulations in other countries. The federal regulations are designed to ensure that electronic devices do not interfere with each other. Recent federal requirements call for PC motherboards to be able to pass EMI emission tests in an "open box" configuration, so manufacturers are not able to rely on the shielding provided by an enclosure to meet EMI emission requirements.

Federal regulations are concerned with peak emissions of a device, such as a power supply, not average emissions. Thus, any techniques that can reduce the peak energy of a device will help the device meet federal requirements. Rather than concentrating or centralizing all unwanted EMI emissions at a single frequency, a spread spectrum technique is often utilized. In a spread spectrum technique, the EMI emissions are spread out or dispersed over a range of frequencies, instead of being concentrated at one particular frequency. The reduction in a devices peak EMI emission can be as great 10 dB through use of a spread spectrum technique. The same total amount of EMI emissions is still present; however, the peak value is reduced.

Prior art spread spectrum techniques utilize numerous electrical components including a crystal oscillator to provide the necessary frequency change. The type and number of necessary electrical components in prior art electrical devices significantly increase the cost of the overall electrical device. In addition, these prior art techniques suffer from poor jitter performance.

In conjunction with a power supply, pulse width modulators are used in conjunction with power supplies as a switching device which either turns the power supply full on or full off. With the repetitive pulsating currents of the power supply, peak EMI emissions are produced at a fundamental frequency of the power supply. It is desirous to spread or disperse these unwanted peak EMI emissions over a range of frequencies.

For the reasons stated above, and for other reasons stated below which will become apparent to those skilled in the art upon reading and understanding the present specification, there is a need for an inexpensive spread spectrum design for electronic devices such as power supplies which will utilize few inexpensive components, while still provide the necessary change in frequency to reduce peak EMI emissions.

SUMMARY OF THE INVENTION

The above-mentioned problems with conventional techniques for reducing electromagnetic interference (EMI) and other problems are addressed by the present invention and will be understood by reading and studying the following specification. A system and method for spreading or dispersing EMI emissions associated with an electrical system over a range of frequencies is described. The system and method utilizes a binary counter in conjunction with a resistor network such that the EMI emissions associated with the electrical system are dispersed over a range of frequencies.

In particular, an illustrative embodiment of the present invention includes an electrical system having a pulse width generator which generates a clock signal and having a voltage source connected to the pulse width generator. A binary counter has a clock input and a plurality of outputs. The clock signal generated from the pulse width generator is connected to the clock input of the binary counter. A plurality of parallel resistors are connected to the plurality of outputs of the binary counter and connected to a node. A timing resistor is connected between a first voltage potential and the node, while a timing capacitor is connected between the node and a second voltage potential. The node is also connected to an input of the pulse width modulator, thereby completing the circuit.

In another preferred embodiment, a method of spreading EMI emissions associated with an electrical system over a range of frequencies is provided. The method provides for generating an incrementing clock signal with a pulse generator and for incrementing a binary counter with each incremented clock signal. The method also provides for electrically connecting a plurality of parallel resistors between a plurality of outputs of the binary counter and a node. The method further provides for electrically connecting a timing resistor between a first voltage potential and the node, while electrically connecting a timing capacitor between the node and a second voltage potential. Finally, the method provides for electrically connecting the node to an input of the pulse width generator, thereby completing the circuit.

In yet another preferred embodiment, a method of spreading EMI emissions associated with an electrical system over a range of frequencies is provided. The method provides for incrementing a clock signal of a pulse width modulator. The method also provides for incrementing a binary counter with each incremented clock signal. The method further provides for altering a resistor/capacitor time constant based upon an output of the binary counter. Finally, the method provides for changing a frequency of the electrical system in reaction to the resistor/capacitor time constant.

DESCRIPTION OF THE PREFERRED EMBODIMENTS

In the following Description of the Preferred Embodiments, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and structural, logical, mechanical, or electrical changes may be made without departing from the scope of the present invention. The following Description of the Preferred Embodiments, therefore, is not to be taken in a limiting sense, and the scope of the present invention is defined by the appended claims. Throughout the detailed description, identical or similar numbers refer to identical or similar elements.

There are several conventional approaches used to combat electromagnetic interference (EMI) within an electrical circuit. Such techniques include utilization of a large and expensive passive inductor capacitor filter, a shield in the ground plane, or filtering components. However, these conventional approaches add a significant cost to a system. In addition, electrical circuits utilizing conventional approaches will often not pass federal regulations regarding maximum EMI radiation limits. Federal regulations dictate maximum peak EMI emissions, rather than average EMI emissions. Thus, any type of design that can reduce the peak energy of a circuit will help the circuit meet federal requirements. A more recent conventional approach used in this area is a spread spectrum technique. Digital circuits which spread or disperse EMI emissions over a range of frequencies have been developed.

Figure 1:
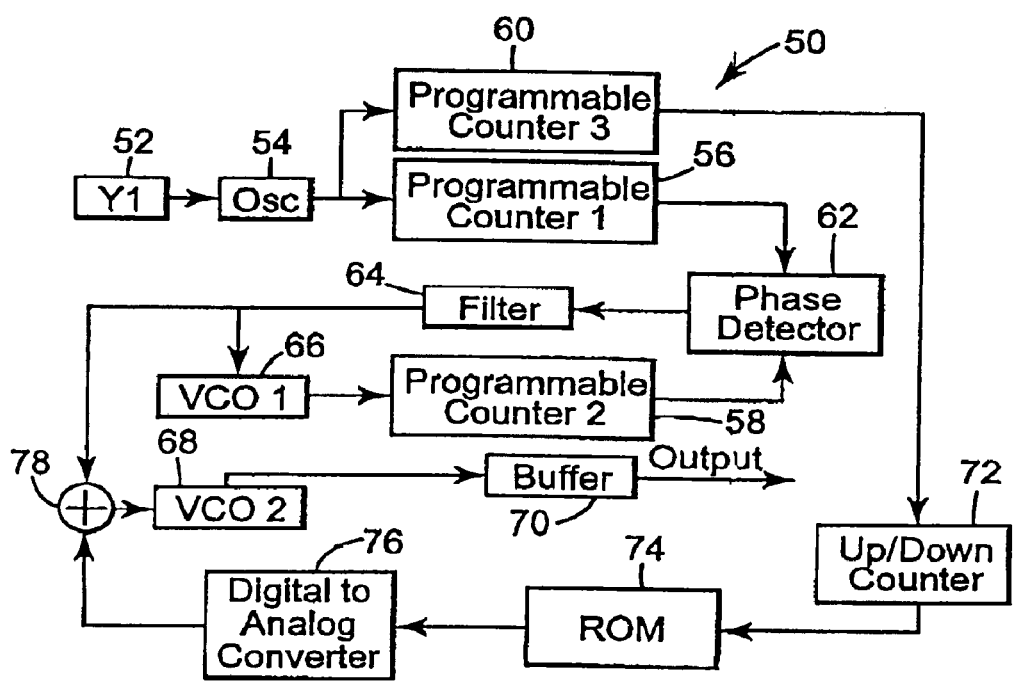
FIG. 1 is an electric circuit block diagram illustrating a prior art circuit embodiment used for providing a spread spectrum clock output signal.

FIG. 1 is an electrical circuit block diagram illustrating a prior art circuit embodiment used for providing a spread spectrum clock output signal. The circuitry shown in FIG. 1 spreads or disperses EMI emissions over a range of frequencies, such that a peak emission is significantly lowered. As shown in FIG. 1, spread spectrum clock generator 50 includes numerous digital components. More specifically, spread spectrum clock generator 50 includes piezoelectric crystal 52, oscillator circuit 54, programmable counters 56, 58 and 60, phase detector 62, filter 64, voltage controlled oscillators (VCO) 66 and 68, buffer 70, up-down counter 72, ROM 74, digital-to-analog converter 76, and adder 78.

Piezoelectric crystal 52 and oscillator circuit 54 generate a stable clock pulse train or unmodified clock signal. A first programmable counter 56 divides the unmodified clock signal by an integer number (M). Voltage controlled oscillator 66 generates an output clock signal that is proportional to the input voltage from phase detector 62 through filters 64. Second programmable counter 58 divides the signal from VCO 68 by an integer number (N). Counters 58 and 60 are the two inputs to phase detector 62. Phase detector 62 and filter 64 generate an analog signal that is proportional to the errors in phase between first and second programmable counters 56 and 58, respectively. Accordingly, the output for phase detector 62 and filter 64 each represents the frequency of oscillator circuit 54 times N divided by M. When N and M are constant, VCO 66 is operating as a standard phase lock-loop circuit.

Second voltage controlled oscillator 68 receives an input from adder 78 which comprises a constant output from filter 64 combined with the input from digital-to-analog converter 76. The input from digital-to-analog converter 76 varies the frequency of VCO. VCO 68 is connected through buffer 70 as the spread spectrum clock output. The modulation of spread spectrum clock generator 50 can be brought to a known condition by setting up/down counter 72. Thus, by resetting counter 72, the input to VCO 68 represents a start of a cycle and VCO 68 promptly adjusts to provide a corresponding frequency.

Spread spectrum clock generator 50, shown in FIG. 1, is designed for use with a microprocessor or a DC—DC converter. Spread spectrum clock generator 50 includes various digital components which increase the overall cost of the electrical device. In addition, this circuitry suffers from poor jitter performance in that the circuit suffers from poor reduction of noise.

The present invention provides a new and useful electrical circuit which will spread or disperse unwanted EMI emissions associated with an or electrical device such as a power supply, a DC—DC converter, or a microprocessor over a range of frequencies. The present invention accomplishes this goal through use of a minimal amount of inexpensive components, thereby minimizing the expense of the overall circuit. Specifically, the present invention utilizes a binary counter and a plurality of parallel resistors to alter a resistor/capacitor time constant, thereby accomplishing a spread spectrum of EMI emissions. Conversely, the prior art circuit shown in FIG. 1 utilizes several expensive digital components to accomplish a spread spectrum of EMI emissions. Thus, the present invention provides a spread spectrum of EMI emissions through a simply, minimal component, and inexpensive design.

Figure 2A:
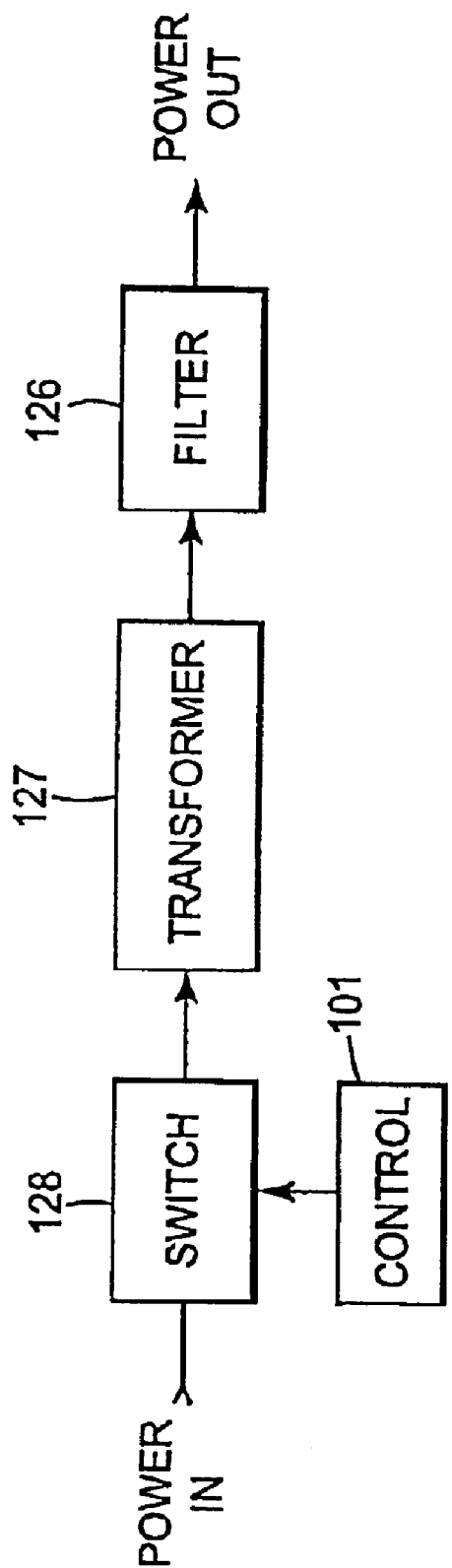
FIG. 2A is a general block diagram of a DC—DC converter.

FIG. 2A is a block diagram of DC—DC converter 100 incorporating the present invention. The present invention provides a spread spectrum pulse width modulated pulse train signal. As shown in FIG. 2A, DC—DC converter 100 includes power switch 128, transformer 127, filter 126, and control 101.

As shown in FIG. 2A, power switch 128 receives an input power. Power switch 128 provides an on/off control for DC—DC converter 100. Transformer 127 is a component known to those in the art and provides an increase or decrease in voltage based upon a coil turn ratio. A coil turn ration is defined by the number of turns of a secondary winding as compared to the number of turns of a primary winding. Therefore, transformer 127 provides a voltage change at the output of transistor 127 as compared to the input of transformer 127. Filter 126 filters undesirous noise from exiting DC—DC converter 100. Pulse with modulator clock control stage 101 generates a pulse train signal of a pulse width modulator whose fundamental frequency is time-varying. Pulse width modulator clock stage 101 is further described with reference to FIG. 2B.

Figure 2B:
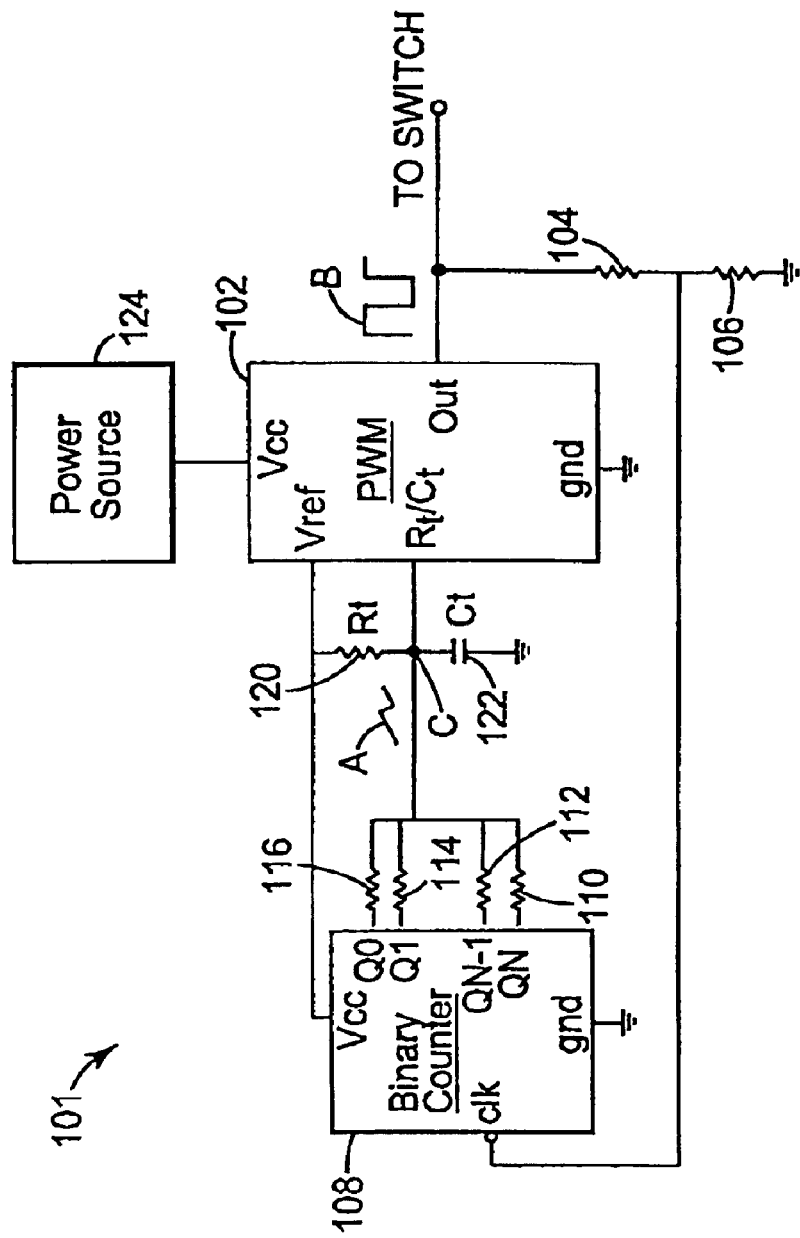
FIG. 2B is an electric circuit diagram of a clock control stage incorporating the present invention for providing a spread spectrum pulse width modulated clock output signal.

FIG. 2B is an electric circuit diagram illustrating pulse width modulator clock control stage 101 shown in FIG. 2A. Pulse width modulator clock control stage 101 further includes pulse width modulator 102, resistors 104 and 106, binary counter 108, resistors 110, 112, 114, and 116, timing resistor 120, timing capacitor 122 and power source 124.

Power source 124 provides adequate power to system 100. In one preferred embodiment, power source 124 provides 15 volts to input $V_{cc}$ of pulse width modulator 102. Also in one preferred embodiment, pulse width modulator 102 creates a clock/pulse train signal through external timing resistor 120 and external timing capacitor 122. Timing capacitor 122 is charged through the combination of timing resistor 120 and resistors 110, 112, 114, and 116 until the voltage of capacitor 122 reaches the voltage at node C, which is a parallel combination of the voltage at timing resistor 120 and the resistors of the set of resistors 110–116 which are tied to reference voltage $V_{ref}$ of pulse width modulator 102. Each resistor of the set of resistors 110, 112, 114, and 116 is operatively couple between an output of binary counter 108 and node C shown in FIG. 2B. Timing capacitor 122 then discharges through an internal current source of pulse width modulator 102, thereby creating a saw tooth waveform in time, represented by saw tooth waveform A which is fed to internal circuitry of pulse width modulator 102 for pulse width modulation. The immediate output of pulse width modulator 102 is a pulse train signal. In one embodiment, the output of pulse width modulator 102 is a square waveform, represented by a square waveform B shown in FIG. 2. This square waveform is fed to the clock input of binary counter 108 through a resistor divider network, represented by resistors 104 and 106. Resistors 104 and 106 provide level frequency shifting between adjacent frequency increments. Each negative transition of square waveform B causes binary counter 108 to increment by a single bit. With each increment of binary counter 108, a different combination of outputs $Q_0$, $Q_1$, $Q_{N-1}$, $Q_N$ is activated and provides current to a combination of parallel resistors 110–116. Thus, a different combination of resistors 110, 112, 114, and 116 are either tied high to reference voltage $V_{ref}$ and are in parallel with timing resistor 120 or tied low to ground. In one preferred embodiment, reference voltage $V_{ref}$ is 5 volts. The change in resistor combination is similar to a stair step digital to analog converter. The change in resistance adds or subtracts charging current to timing capacitor 122 at node C. The combination of parallel resistors tied to reference voltage $V_{ref}$ are also in parallel with timing resistor 120. By adding or subtracting charging current to timing capacitor 122 at node C, and thereby altering a resistor/capacitor time constant at node C, the fundamental frequency of the pulse train signal of pulse width modulator 102 changes with each cycle or pulse of pulse width modulator 102.

The electrical components of FIG. 2B can have various values, while still providing adequate frequency variation. For example, resistors 104 and 106, which make up a resistor divider network, can have values in the range of approximately 1.0–50 kilohms. Preferably, in order to insure level shifting, resistor 104 is 20 kilohms, while resistor 106 is 10 kilohms. Timing resistor 120 preferably has a value in the range of approximately 1.0–10 kilohms, while timing capacitor preferably has a value in the range of approximately 0.1–10 nanofarads.

Resistors 110, 112, 114, and 116 are binary weighed and include a multiplier value and a base value resistance in order to provide substantially equal-distant spacing between adjacent frequency values. The binary scaling factor for resistors 116, 114, 112, and 110, which are connected to outputs $Q_0$, $Q_1$, $Q_{N-1}$, and $Q_N$ are 1xR, 2xR, 4xR and 8xR, respectively. However, it is understood that any number of scaling factors can be utilized without deviating from the present invention. In one preferred embodiment, base resistance R is in the range of approximately 100–1000 kilohms. More particularly, base resistance R is 500 kilohms. Thus, in system 100 shown in FIG. 2, resistor 116 has a value of 500 kilohms, resistor 114 has a value of 1000 kilohms, resistor 112 has a value of 200 kilohms, and resistor 110 has a value of 400 kilohms. It is understood that any number of parallel resistors can be connected to any number of outputs of binary counter 108 without deviating from the present invention. Changing the number of parallel resistors only changes the increment of charging time of capacitor 122, thereby changing the frequency increments between cycles.

Figure 3:
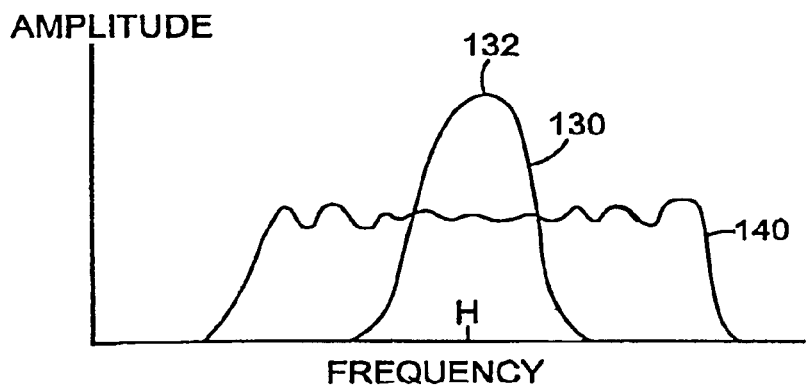
FIG. 3 is a graph plotting frequency versus amplitude of electromagnetic interference radiation in conjunction with the present invention.

FIG. 3 is a graph plotting frequency versus amplitude of EMI radiation. As shown in FIG. 3, line 130 represents the EMI emissions throughout a frequency range generated from a prior art electrical system not utilizing a spread spectrum technique. Line 130 has an extreme peak value 132 at frequency H, which represents a harmonic of a prior art electrical system. Also shown in FIG. 3 is line 140 which represents the EMI emissions throughout a frequency range utilizing the spread spectrum technique of the present invention shown in FIG. 2. Line 140 does not have a singular extreme peak value, but rather has a substantially constant amplitude throughout a wide range of frequencies. As previously discussed, regulations in this and other countries regulate peak EMI emissions throughout a spectacle range of frequencies, at a single frequency, rather than overall EMI emissions throughout a spectral range of frequencies. Thus, with the present invention shown in FIG. 2, the peak EMI emission during a spectral range of the overall system is significantly lowered, thereby passing federal regulations. With the circuitry shown in FIG. 2, peak EMI emissions can be reduced up to 10 dB.

Table 1, shown below, illustrates various component values of electrical system 100 during a full cycle of binary counter 108 utilizing predetermined values for individual components. Columns $Q_N$, $Q_{N-1}$, $Q_1$ and $Q_0$ represent the binary outputs of binary counter 108. The binary outputs are either a one or a zero. If a particular binary output is a one, current flows through the associated resistor. The associated resistor is thereby connected in parallel with timing resistor 120 between reference voltage $V_{ref}$ and node C. Conversely, if a particular binary output is a zero, the associated resistor is connected to ground and no current flows through the associated resistor.

Column $R_{high}$ represents the equivalent resistance of all parallel resistors connected to reference voltage $V_{ref}$, which is 5 volts, while column $R_{low}$ represents the resistance of all parallel resistors connected to ground or 0 volts. Column $V_{EQ}$ is the equivalent voltage at node C, while $I_C$ is a resulting charging current for timing capacitor 122. Column $I_D$ is the resulting discharging current of timing capacitor 122. Column $T_C$ is the time period for timing capacitor 122 to charge for a single cycle, while column $T_D$ is the time period for timing capacitor 122 to discharge for a single cycle. Column $T_{elapsed}$ is the sum of the charging and discharging time periods from the beginning of the first cycle. Thus, column $T_{elapsed}$ is not simply the elapsed time of a particular cycle, but is rather the elapsed time from the start of the first cycle. Column F is the frequency of electrical system 100, and is the reciprocal of the elapsed time $T_{elapsed}$. Column dF is the change in frequency from the previous step, i.e., the frequency increment between cycles.

Table 1 utilizes scaling factors of 1, 2, 4, and 8 for resistors 116, 114, 112, and 110, respectively, and a value of 500 kilohms for the base value of resistors 110–116. Table 1 also utilizes a value of 4.6 kilohms for resistor 120 and a valve of 1.0 nanofarrads for capacitor 127.

Figure 4:
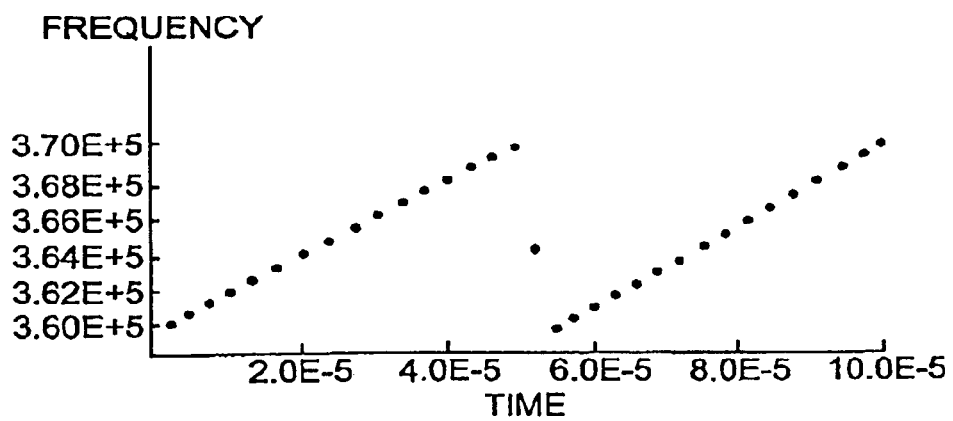
FIG. 4 is a graph plotting a range of frequencies versus time in conjunction with the present invention.
Figure 5:
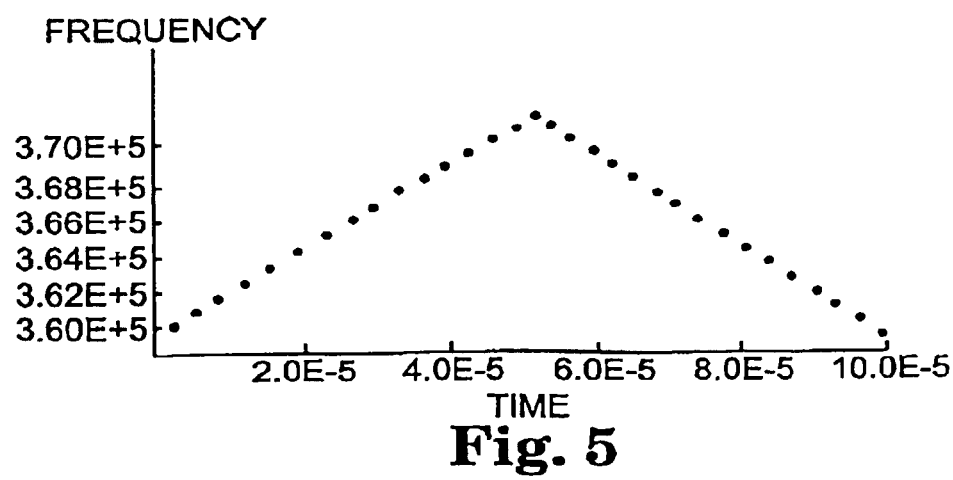
FIG. 5 is a second graph plotting a range of frequencies versus time in conjunction with the present invention.

FIG. 4. However, the second 16 plotted points of FIG. 5 differ from the second 16 plotted points of FIG. 4 in that the plotted points of FIG. 5 are decreasing in frequency with an increase in time. The graph of FIG. 5 represents time versus frequency of circuitry 100 in which binary counter 108 is an up/down counter. With an additional increase in elapsed time, it is clear that the graph of FIGS. 4 and 5 will both include a repeating pattern.

In summary, the present invention provides a unique and novel technique in spreading or dispersing EMI emissions associated with a power supply or electrical device over a range of frequencies. Thus, a particular device will not have a pronounced peak value at a specific frequency, such as a harmonic frequency of the device. The present invention accomplishes this goal by utilizing a binary counter, such as binary counter 108, and a plurality of resistors, such as resistors 110–116 to alter a resistor/capacitor time constant. Thus, a more expensive and power consuming passive inductor capacitor filter is not necessary.

In the claims section of this application, means-plus-function clauses are intended to cover the structures described herein as performing the reciting function and not only structural equivalents but also equivalent structures. In

TABLE 1

| $Q_N$ | $Q_{N-1}$ | $Q_1$ | $Q_0$ | Rhigh | Rlow | Veq | Ic | Id | Tc | Td | Telapsed | F | dF |
|---|---|---|---|---|---|---|---|---|---|---|---|---|---|
| 0 | 0 | 0 | 0 | 1.00E+18 | 2.67E+05 | 0.00 | 6.78E-04 | 6.32E-03 | 2.51E-06 | 2.69E-07 | 2.78E-06 | 3.60E+05 | 0.00E+00 |
| 0 | 0 | 0 | 1 | 4.00E+06 | 2.86E+05 | 0.33 | 6.79E-04 | 6.32E-03 | 2.50E-06 | 2.69E-07 | 5.55E-06 | 3.61E+05 | 5.93E+02 |
| 0 | 0 | 1 | 0 | 2.00E+06 | 3.08E+05 | 0.67 | 6.80E-04 | 6.32E-03 | 2.50E-06 | 2.69E-07 | 8.32E-06 | 3.61E+05 | 5.92E+02 |
| 0 | 0 | 1 | 1 | 1.33E+06 | 3.33E+05 | 1.00 | 6.82E-04 | 6.32E-03 | 2.49E-06 | 2.69E-07 | 1.11E-05 | 3.62E+05 | 5.92E+02 |
| 0 | 1 | 0 | 0 | 1.00E+06 | 3.64E+05 | 1.33 | 6.83E-04 | 6.32E-03 | 2.49E-06 | 2.69E-07 | 1.38E-05 | 3.62E+05 | 5.92E+02 |
| 0 | 1 | 0 | 1 | 8.00E+05 | 4.00E+05 | 1.67 | 6.84E-04 | 6.32E-03 | 2.49E-06 | 2.69E-07 | 1.66E-05 | 3.63E+05 | 5.92E+02 |
| 0 | 1 | 1 | 0 | 6.67E+05 | 4.44E+05 | 2.00 | 6.85E-04 | 6.31E-03 | 2.48E-06 | 2.69E-07 | 1.93E-05 | 3.64E+05 | 5.91E+02 |
| 0 | 1 | 1 | 1 | 5.71E+05 | 5.00E+05 | 2.33 | 6.87E-04 | 6.31E-03 | 2.48E-06 | 2.69E-07 | 2.21E-05 | 3.64E+05 | 5.91E+02 |
| 1 | 0 | 0 | 0 | 5.00E+05 | 5.71E+05 | 2.67 | 6.88E-04 | 6.31E-03 | 2.47E-06 | 2.69E-07 | 2.48E-05 | 3.65E+05 | 5.91E+02 |
| 1 | 0 | 0 | 1 | 4.44E+05 | 6.67E+05 | 3.00 | 6.89E-04 | 6.31E-03 | 2.47E-06 | 2.69E-07 | 2.76E-05 | 3.65E+05 | 5.91E+02 |
| 1 | 0 | 1 | 0 | 4.00E+05 | 8.00E+05 | 3.33 | 6.90E-04 | 6.31E-03 | 2.46E-06 | 2.69E-07 | 3.03E-05 | 3.66E+05 | 5.90E+02 |
| 1 | 0 | 1 | 1 | 3.64E+05 | 1.00E+06 | 3.67 | 6.92E-04 | 6.31E-03 | 2.46E-06 | 2.69E-07 | 3.3E-05 | 3.67E+05 | 5.90E+02 |
| 1 | 1 | 0 | 0 | 3.33E+05 | 1.33E+06 | 4.00 | 6.93E-04 | 6.31E-03 | 2.45E-06 | 2.70E-07 | 3.57E-05 | 3.67E+05 | 5.90E+02 |
| 1 | 1 | 0 | 1 | 3.08E+05 | 2.00E+06 | 4.33 | 6.94E-04 | 6.31E-03 | 2.45E-06 | 2.70E-07 | 3.85E-05 | 3.68E+05 | 5.90E+02 |
| 1 | 1 | 1 | 0 | 2.86E+05 | 4.00E+06 | 4.67 | 6.95E-04 | 6.30E-03 | 2.44E-06 | 2.70E-07 | 4.12E-05 | 3.68E+05 | 5.89E+02 |
| 1 | 1 | 1 | 1 | 2.67E+05 | 1.00E+18 | 5.00 | 6.97E-04 | 6.30E-03 | 2.44E-06 | 2.70E-07 | 4.39E-05 | 3.69E+05 | 5.89E+02 |

As shown in Table 1, the charging time of capacitor 122 decreases with each increment of binary counter 108, while the discharge time of capacitor 122 increases with each increment of binary counter 108. Thus, the overall elapsed time from cycle to cycle remains substantially constant. Thus, the change in frequency between cycles also remains substantially constant, as shown in column dF.

FIG. 4 is a graphical representation of the frequency of system 100 versus time. In particular, FIG. 4 is a graph plotting the elapsed time listed in Table 1 under column $T_{elapsed}$ versus frequency listed in Table 1 under column F. The first 16 plotted points of FIG. 4 represent the values shown in Table 1. The second 16 plotted points of FIG. 4 represent an overall second cycle of circuit 100. The frequency of the second set of plotted points is identical to the frequency of the first set of plotted points, and the change in frequency between cycles of the second set of plotted points is identical to the change in frequency between cycles of the first set of plotted points. The graph of FIG. 4 represents elapsed time versus frequency of circuit 100 in which binary counter 108 is a unidirectional counter.

FIG. 5 is a second graphical representation of elapsed time versus frequency of circuit 100. The first 16 plotted points of FIG. 5 are identical to the first 16 plotted points addition, although specific embodiments of the invention have been set forth herein in some detail, it is understood that this has been done for the purpose of illustration only and is not to be taken as a limitation on the scope of the invention as defined in the appended claims. It is to be understood that various alterations, substitutions, and modifications may be made to the embodiment described herein without departing from the spirit and scope of the appended claims.

What is claimed is:

1. An apparatus for spreading electromagnetic interference associated with an electrical system over a range of frequencies, the electrical system having a pulse width modulator that provides a clock signal and having a power source connected to the pulse width modulator, the apparatus comprising:

a binary counter having a clock input and a plurality of outputs, wherein the clock signal is operatively coupled to the clock input;

a plurality of resistors, wherein each of the resistors is coupled between a different one of the plurality of outputs of the binary counter and a node;

a timing resistor coupled between a first voltage potential and the node;

a timing capacitor coupled between the node and a second voltage potential; and wherein the node is coupled to an input of the pulse width modulator.

2. The apparatus of claim 1, wherein the binary counter is a unidirectional counter.

3. The apparatus of claim 1, wherein the binary counter is an up/down counter.

4. The apparatus of claim 1, wherein each of the plurality of resistors is binary weighed and includes a base value and a multiplier value.

5. The apparatus of claim 4, wherein the base value is between approximately 100 kilohms and 1000 kilohms.

6. The apparatus of claim 1, wherein the timing resistor has a value between approximately 1.0 kilohms and 10.0 kilohms.

7. The apparatus of claim 1, wherein the timing capacitor has a value in the range of approximately 0.1 nanofarrads and 10.0 nanofarrads.

8. The apparatus of claim 1, further comprising:
a resistor divider network comprising:
a first resistor connected to the clock signal of the pulse width modulator;
a second resistor connected between the first resistor and a third voltage; and
wherein the clock input of the binary counter is operatively coupled between the first and the second resistors.

9. The apparatus of claim 8, wherein the first and second resistors each have a value between approximately 1.0 kilohms and 50.0 kilohms.

10. An apparatus creating a pulse train signal of a pulse width modulator whose fundamental frequency is time-varying, the apparatus comprising:
a power source coupled to the pulse width modulator;
a resistor/capacitor network coupled to the pulse width modulator, the resistor/capacitor network having a resistor/capacitor time constant;
incrementing means for incrementing a binary count; and
altering means coupled between the incrementing means and the resistor/capacitor network for altering the resistor/capacitor time constant based on the binary count to correspondingly time-vary the fundamental frequency of the pulse train signal of the pulse width modulator.

11. The apparatus of claim 10, wherein the altering means comprise:
a plurality of resistors, wherein each of the resistors is coupled between a corresponding different output of a binary counter and a first voltage potential.

12. A system comprising:
a power source;
a pulse width modulator coupled to the power source, the pulse width modulator providing a pulse train signal at an output;
a binary counter coupled to the pulse width modulator, the binary counter having an input and a plurality of outputs, wherein the pulse train signal is operatively coupled to the input;
a plurality of resistors, wherein each of the resistors is operatively coupled between a corresponding different one of the pluarality of outputs of the binary counter and operatively coupled to a node;
a timing resistor operatively coupled between a first voltage potential and the node;

a timing capacitor operatively coupled between the node and a second voltage potential; and
wherein the node is operatively coupled to an input of the pulse width modulator.

13. The system of claim 12, wherein the binary counter is a unidirectional counter.

14. The system of claim 12, wherein the binary counter is an up/down counter.

15. The system of claim 12, wherein each of the plurality of resistors is binary weighted and includes a base value and a multiplier value.

16. The system of claim 15, wherein the base value is between approximately 100 kilohms and 1000 kilohms.

17. The system of claim 12, wherein the timing resistor has a value between approximately 1.0 kilohms and 10.0 kilohms.

18. The system of claim 12, wherein the timing capacitor has a value between approximately 0.1 nanofarrads and 10.0 nanofarrads.

19. The system of claim 12, further comprising:
a resistor divider network operatively coupled between the pulse width modulator and the binary counter, the resistor divider network comprising:
a first resistor connected to the output of the pulse width modulator;
a second resistor connected between the first resistor and a third voltage potential; and
wherein the input of the binary counter is operatively coupled between the first and the second resistors.

20. The system of claim 19, wherein the first and second resistors each have a value between approximately 1.0 kilohms and 50.0 kilohms.

21. The system of claim 12, further comprising:
a resistor divider network coupled between the output of the pulse width modulator and the input of the binary counter.

22. A system for disposing electromagnetic interference associated with a DC—DC converter, the system comprising:
a power switch for receiving an input power;
a filter operatively coupled to the power switch;
a pulse width modulator clock control stage operatively coupled to the power switch, the pulse width modulator clock control stage comprising:
a power source;
a pulse width modulator coupled to a pulse train source, the pulse width modulator providing a pulse train signal at an output;
a binary counter coupled to the pulse width modulator, the binary counter having an input and a plurality of outputs, wherein the pulse train signal at the output of the pulse width modulator is operatively coupled to the input of the binary counter;
a plurality of resistors, wherein each of the resistors is operatively coupled between a corresponding different one of the outputs of the binary counter and operatively coupled to a node;
a timing resistor operatively coupled between a first voltage potential and the node;
a timing capacitor operatively coupled between the node and a second voltage potential; and
wherein the node is coupled to an input of the pulse width modulator.

23. The system of claim 22, wherein the binary counter is a unidirectional counter.

24. The system of claim 22, wherein the binary counter is an up/down counter.

25. The system of claim 22, wherein each of the plurality of resistors is binary weighted and includes a base value and a multiplier value.

26. The system of claim 25, wherein the base value is between approximately 100 kilohms and 1000 kilohms.

27. The system of claim 22, wherein the timing resistor has a value between approximately 1.0 kilohms and 10.0 kilohms.

28. The system of claim 22, wherein the timing capacitor has a value between approximately 0.1 and 10.0 nanofarrads.

29. The system of claim 22, further comprising:
a resistor divider network operatively coupled between the pulse width modulator and the binary counter, the resistor divider network comprising:
a first resistor connected to the output of the pulse width modulator;
a second resistor connected between the first resistor and a third voltage potential; and
wherein the input of the binary counter is operatively coupled between the first and the second resistors.

30. The system of claim 29, wherein the first and second resistors of the resistor divider network each have a value between approximately 1.0 kilohms and 50.0 kilohms.

31. A method of creating a pulse train signal of a pulse width modulator having a fundamental frequency that is time-varying, the method comprising the steps of:
incrementing a binary count;
altering a resistor/capacitor time constant of a resistor/capacitor network based upon the binary count; and
creating the pulse train signal of the pulse width modulator having the fundamental frequency that is time-varying, wherein the fundamental frequency of the pulse train signal is based upon the resistor/capacitor time constant.

32. The method of claim 31, wherein the step of altering the resistor/capacitor time constant comprises:
operatively coupling a plurality of resistors to a respective output of a binary counter.

33. The method of claim 31, wherein the step of incrementing the binary count comprises:
incrementing the binary count of a binary counter by coupling the pulse train signal from the pulse width modulator to an input of the binary counter.

* * * * *